US006850220B2

(12) United States Patent
Sakaguchi (10) Patent No.: US 6,850,220 B2
(45) Date of Patent: Feb. 1, 2005

(54) INPUT METHOD, INPUT SYSTEM, AND PROGRAM FOR TOUCH PANEL

(75) Inventor: Akira Sakaguchi, Fuchu (JP)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 10/244,656

(22) Filed: Sep. 16, 2002

(65) Prior Publication Data

US 2003/0052866 A1 Mar. 20, 2003

(30) Foreign Application Priority Data

Sep. 17, 2001 (JP) .................................... 2001-281172

(51) Int. Cl.$^7$ ................................................ G09G 5/08
(52) U.S. Cl. ...................... 345/157; 345/173; 345/856
(58) Field of Search ................................. 345/156, 157, 345/163, 856–862

(56) References Cited

U.S. PATENT DOCUMENTS 5,808,604 A * 9/1998 Robin ......................... 345/862
5,835,079 A * 11/1998 Shieh ......................... 345/173
6,278,443 B1 * 8/2001 Amro et al. ................. 345/173
2002/0084991 A1 * 7/2002 Harrison et al. ............. 345/173

* cited by examiner

Primary Examiner—Kent Chang
(74) Attorney, Agent, or Firm—Gregory M. Doudnikoff (57) ABSTRACT

To provide input means by which a mouse position can be accurately pointed to in a touch panel input system that does not have a pointing device capable of accurate pointing such as a mouse. Input events, which are mouse events (touches of a touch panel display) or keyboard events, are registered to be hooked, and a mouse pointer window is generated. An event hook section is notified of an occurrence of an input event, and the event is processed. In processing the event, a click event of the mouse event is disabled, and the mouse pointer window is displayed at the mouse position. When a mouse movement is selected on a tool window or a keyboard, the mouse position and the mouse pointer window are moved to that direction. When a click event is selected on the tool window or the keyboard, the click event is generated and issued.

14 Claims, 6 Drawing Sheets

INPUT METHOD, INPUT SYSTEM, AND PROGRAM FOR TOUCH PANEL

BACKGROUND OF THE INVENTION

1. Field of the Invention

The present invention relates to an input method, an input system, and a program for a touch panel display. More particularly, the invention relates to input means by which a mouse position in touch panel input can be accurately pointed to.

2. Description of the Related Art

Information appliances used by general public users, such as an ATM (automatic teller machine) and an ACM (automatic consulting machine), are designed to allow for general users who are not used to computer operation. Thus, many of these automatic appliances adopt a touch panel as an input device for convenience of users.

For example, Japanese Published Unexamined Patent Application No. 2000-89887 describes a character input system for a touch panel. In this character input system, character buttons and other functional buttons are displayed on a touch panel, and a character is input in an input field by a touch of an area that displays the character. The system is also configured to pass an input string in the input field as an argument to an execution program in response to a touch of an area displaying an execution button. This input system enables even a user who is unfamiliar with computers to operate an information processing system (or terminal) such as a computer only by touching a touch panel.

In this character input system, a single operation of touching a touch panel provides execution of a procedure of detecting the touched position, determining a function (e.g., input of a character to an input field or execution of a program) assigned to an area that includes the touched position, and performing the function. Thus, a mouse input event is issued with a touch of the touch panel. Then, with this mouse input event, a mouse movement event is issued for moving the mouse position to the touched position, and at the same time, a mouse left click event is issued at the mouse position. The mouse left click event initiates a function specified by the mouse position, such as an application program.

In automatic appliances that have the above described input system or other types of touch panel input, mouse pointer display is disabled since there is little need to display the current mouse position.

The above described touch panel input provides a good user interface that is easily used by general users who are unfamiliar with computers. However, this interface may not be convenient in developing or maintaining application programs.

Specifically, in developing or maintaining programs, application programs such as an explorer are used to operate files and so on. In those application programs, a mouse position must be put on objects such as file names and a menu bar that are displayed in a relatively small area. However, such accurate pointing is difficult by touching a touch panel with a finger. Of course, if a system has an input interface that adopts a pointing device such as based on mouse input, input with accurate pointing is possible by means of such a pointing device. However, to reduce system cost, many systems do not have an input interface such as a mouse. Therefore, there is a problem that efficiency in developing programs and work efficiency in maintaining programs decrease.

Further, as described above, mouse pointer display is disabled in many systems. Thus, there is a problem that the current mouse position cannot be known in developing and maintaining programs in an on-site environment, which decreases development efficiency and work efficiency.

Further, as described above, a mouse movement event and a mouse left click event are issued substantially simultaneously for the conventional touch panel input. In developing and maintaining programs, however, it may be desired to issue a click event other than a mouse left click event, e.g., a mouse right click event and a drag-and-drop event, along with a mouse movement event. The conventional touch panel input has a problem that it cannot meet this need.

Among these problems, the problem that the mouse pointer is not displayed and the problem that a click event other than a mouse left click event are not issued may be addressed by improving application software or a device driver for the touch panel. However, since it is preferred that application software for performing on-site processing is as small as possible, additional utility software for use in developing and maintaining programs is not desirable. Further, because changing the device driver depends on a vendor or the type of the touch panel, it is desirable to have a solution that does not involve change of the device driver.

SUMMARY OF THE INVENTION

An object of the present invention is to provide means for displaying the current mouse position in an input system for a touch panel without adding extra functions to application software used for on-site processing.

Another object of the invention is to provide input means by which a mouse position can be accurately pointed to in a touch panel input system that does not have a pointing device capable of accurate pointing such as a mouse.

Another object of the invention is to provide input means for a touch panel by which left click events as well as other click events can be issued.

Another object of the invention is to provide input means for achieving the above objects in a manner that is universally applicable to touch panels of a plurality of vendors or types without depending on device drivers for the touch panels.

The outline of the invention herein is described as follows. An input method according to the invention herein is an input method in an information processing system that detects a touch of a touch panel or a press of a keyboard as an input event, the method comprising the steps of: generating a mouse pointer window in response to input mode being switched; receiving and hooking an input event; if the input event is a mouse event, disabling the mouse event following a mouse movement event; and displaying the mouse pointer window at a position where the touch panel is touched in the input event (a mouse position). Thus, in the invention herein, an input event is not immediately executed but hooked. Then, if the hooked event is a mouse input event, following processing is disabled, and the mouse pointer window is displayed at a touched position on the touch panel. Generally, in automatic appliances such as an ATM, the current mouse position is not known since mouse pointer display is disabled. In this invention, the mouse pointer window is generated and displayed at the current mouse position; therefore, the mouse position can be accurately known. Further, even when a mouse event occurs, the mouse position is only moved and displayed at this stage, as opposed to the prior art where the mouse movement and the click event are simultaneously occurs. Thus, the mouse movement and the following processing can be separated.

The processing after the mouse movement can be illustrated as follows. For example, in the input method according to the invention, a tool window is displayed on the touch panel, wherein a touch of a certain function button in the tool window allows execution of a predetermined procedure defined for the area of the button. Thus, the input method according to the invention further comprises the step of generating a tool window to control mouse events and displaying the tool window on the touch panel. The method may further comprise the steps of: if the hooked input event is a mouse event, making a first determination whether the mouse position is within the area of the tool window; executing the steps of disabling the mouse event and displaying the mouse pointer window if the result of the first determination step is false; making a second determination whether the mouse position is within the area of a mouse movement button in the tool window if the result of the first determination step is true; and moving the mouse pointer window in a direction assigned by the mouse movement button and displaying the mouse pointer window if the result of the second determination step is true. Thus, when a mouse movement button in the tool window is touched, the mouse position is moved to the direction of the button, and the mouse pointer window is moved accordingly. The input method according to the invention may further comprise the steps of: making a third determination whether the mouse position is within the area of a speed change button for changing moving speed of the mouse pointer window in the tool window if the result of the second determination step is false; and changing a setting of moving distance of the mouse pointer window if the result of the third determination step is true. Thus, when the button for changing moving speed of the mouse is touched, the setting of the mouse moving speed (moving distance of the mouse position) is changed. In this manner, the input method according to the invention provides fine-tuning of the mouse movement by using the tool buttons. The mouse moving speed may be set to have three levels and may be configured such that selecting the mouse movement button cyclically changes the mouse movement interval. The order of these determination steps may be changed as appropriate without departing from the spirit of the invention. That is, as long as the events of displaying and moving the mouse position and the following mouse events can be separated, the order of the determination and processing of the following mouse events can be arbitrary.

The tool button of the invention may include functions of issuing mouse click events. Thus, the input method according to the invention may further comprise the steps of: if the result of the second determination step is false, making a fourth determination whether the mouse position is within the area of a mouse event issuing button in the tool window; and issuing a mouse event assigned to the mouse event issuing button if the result of the fourth determination step is true. With this input method, a mouse event defined for the area of a button can be issued. The mouse event may be, for example, a left button click, a left button double click, a left button drag-and-drop, a right button click, or a right button drag-and-drop.

The tool window can be configured to be moved by a mouse event when it interferes with other objects. Thus, the input method according to the invention may further comprise, if the result of the second determination step is false and if the mouse position is not within any one of the areas of buttons in the tool window, the step of moving the tool window to a mouse position where a next mouse event occurs and displaying the tool window. That is, a touch of an area in the tool window out of the function buttons is taken as an intention of moving the tool window.

The above described functions of the tool window may also be provided by keyboard input. Thus, the input method according to the invention may further comprise the steps of: if the hooked input event is a keyboard event, making a fifth determination whether a pressed key in the keyboard event is a mouse movement key; and moving the mouse pointer window in a direction assigned to the mouse movement key and displays the mouse pointer window if the result of the fifth determination step is true. The input method may further comprise the steps of: if the hooked input event is a keyboard event, making a sixth determination whether a pressed key in the keyboard event is a speed change key for changing a moving speed of the mouse pointer window; and changing a setting of moving distance of the mouse pointer window if the result of the sixth determination step is true. The input method according to the invention may further comprise the steps of: if the hooked input event is a keyboard event, making a seventh determination whether a pressed key in the keyboard event is a mouse event issuing key; and issuing a mouse event assigned to the mouse event issuing key if the result of the seventh determination step is true. The same functions as those of the tool window can be provided by a keyboard as well.

Besides the above described method, the invention may also be considered as a system or a program.

BRIEF DESCRIPTION OF THE DRAWINGS

Now, an embodiment of the invention will be described in detail with reference to drawings. However, the invention can be implemented in many different modes and should not be considered as being limited to the description of this embodiment. Throughout the embodiment, like elements are designated with identical reference numerals.

Now, an embodiment of the invention will be described in detail with reference to drawings. However, the invention can be implemented in many different modes and should not be considered as being limited to the description of this embodiment. Throughout the embodiment, like elements are designated with identical reference numerals.

DESCRIPTION OF THE PREFERRED EMBODIMENT

The embodiment is described below mainly in regard to a method or a system. However, it will be apparent to those skilled in the art that the invention can also be implemented as a computer executable program. Thus, the invention can be embodied as hardware, software, or a combination of hardware and software. The program can be stored on any computer readable medium, such as a hard disk, CD-ROM, an optical storage device, or a magnetic storage device.

Figure 1:
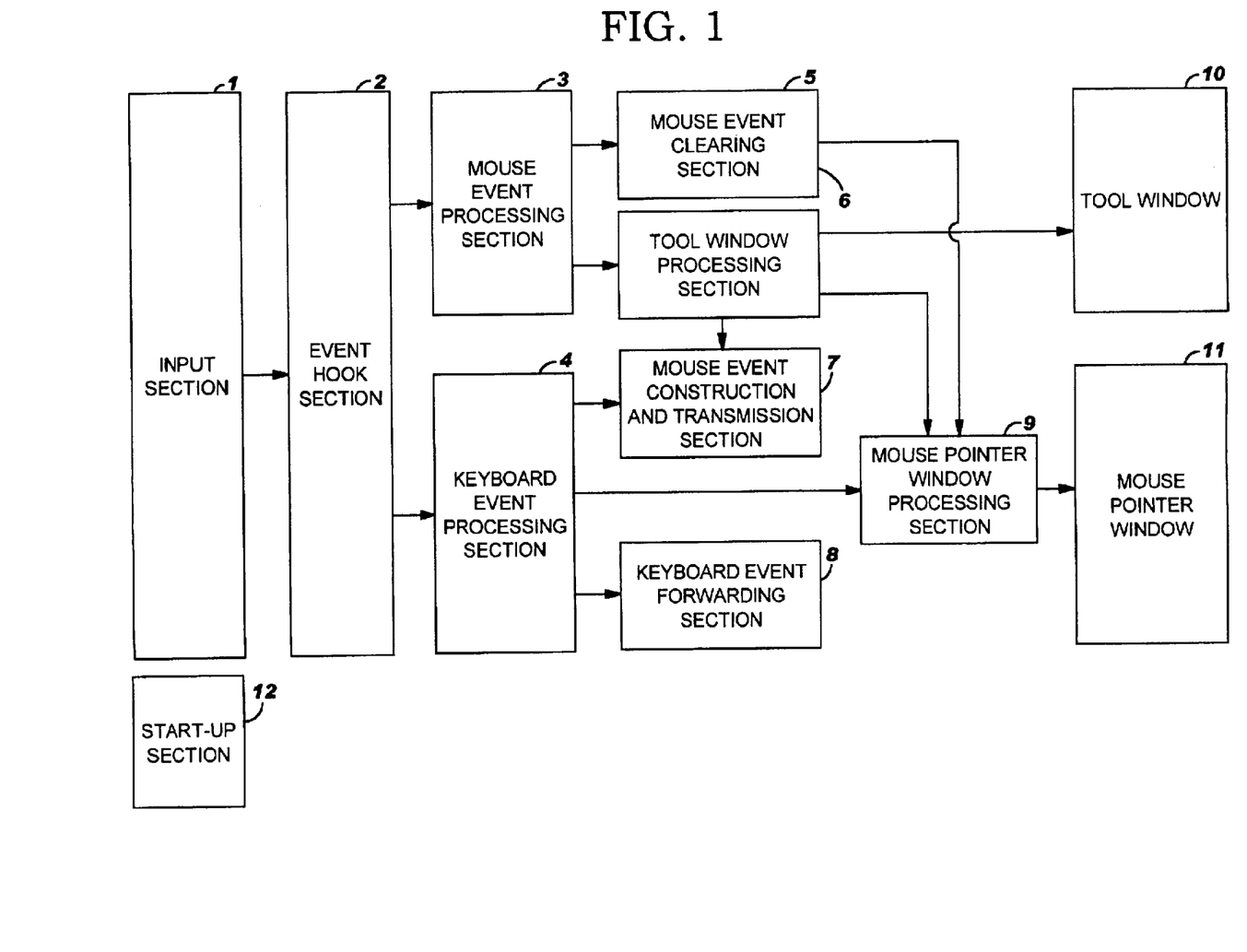
FIG. 1 is a block diagram illustrating functions of an exemplary input system for a touch panel according to an embodiment of the invention.

FIG. 1 is a block diagram illustrating functions of an exemplary input system for a touch panel according to this embodiment of the invention. The input system in this embodiment has an input section 1, an event hook section 2, a mouse event processing section 3, a keyboard event processing section 4, a mouse event clearing section 5, a tool window processing section 6, a mouse event construction and transmission section 7, a keyboard event forwarding section 8, a mouse pointer window processing section 9, a tool window 10, a mouse pointer window 11, and a start-up section 12.

One example of information processing apparatus capable of implementing the input system according to this embodiment may be an ATM used in banks. As is well known, the ATM has functions for receiving and paying cash, communicating with a host computer, reading information that is magnetically recorded on a card or a bankbook, and printing on a bankbook or a transaction statement, as well as input functions through a touch panel or a ten key keyboard. As such, hardware of the ATM includes devices for these functions that typical computer systems do not have. However, the ATM is essentially the same as typical computer systems in regard to information processing functions. Specifically, the ATM has hardware resources that computer systems generally have, such as a central processing unit (CPU), main memory (RAM), nonvolatile memory (ROM), cache memory, and an input/output controller (I/O). However, to reduce cost, the ATM does not have a pointing device (e.g., a mouse) and an input interface for the pointing device. Here, it is appreciated that the invention is not limited to the input method for the ATM but can be applied to input methods for other information processing systems that have a touch panel.

Functions of each processing section shown in FIG. 1 are mainly embodied in software (program component). Each function may be embodied in a single program component or a combination of program components. Alternatively, a plurality of the functions may be embodied in a single program component.

The input section 1 is an input device (e.g., a touch panel or a keyboard) and a driver for the input device, and generates an input event. In conventional input devices that do not adopt the input system according to this embodiment, an input event is simply passed to application software. Specifically, in the case of touch panel input, an input event is generated as a mouse event, and a mouse movement event is passed followed by a mouse left-click event. In the case of keyboard input, a function assigned to a pressed key (e.g., input of a character or execution of a program) is passed as a keyboard event. However, in the present embodiment, once an execution module is started by the start-up section 12, the input event is hooked as will be described below.

The event hook section 2 hooks the input event generated by the input section 1. Specifically, the event hook section 2 is informed of the generation of the event when a mouse input event or a keyboard input event occurs. The event hook section 2 determines whether the input event is a mouse event or a keyboard event and passes processing to the mouse event processing section 3 or the keyboard event processing section 4 according to the type of the input event.

The mouse event processing section 3 performs processing if the input event is a mouse event. Depending on the touched position on the touch panel (the mouse position), the mouse event processing section 3 performs processing in different ways. If the mouse position is out of the display area of the tool window, it passes processing to the mouse event clearing section 5. If the mouse position is within the display area of the tool window, it passes processing to the tool window processing section 6.

The keyboard event processing section 4 performs processing if the input event is a keyboard event. Depending on which key is pressed, the keyboard event processing section 4 performs processing in different ways. If the pressed key is a key for which a function of issuing a mouse click event is defined, it passes processing to the mouse event construction and transmission section 7. If the pressed key is a key for which a direction or speed of a mouse movement is defined, it passes processing to the mouse pointer window processing section 9. If a key without definition is pressed, processing is passed to the keyboard event forwarding section 8.

Figure 2:
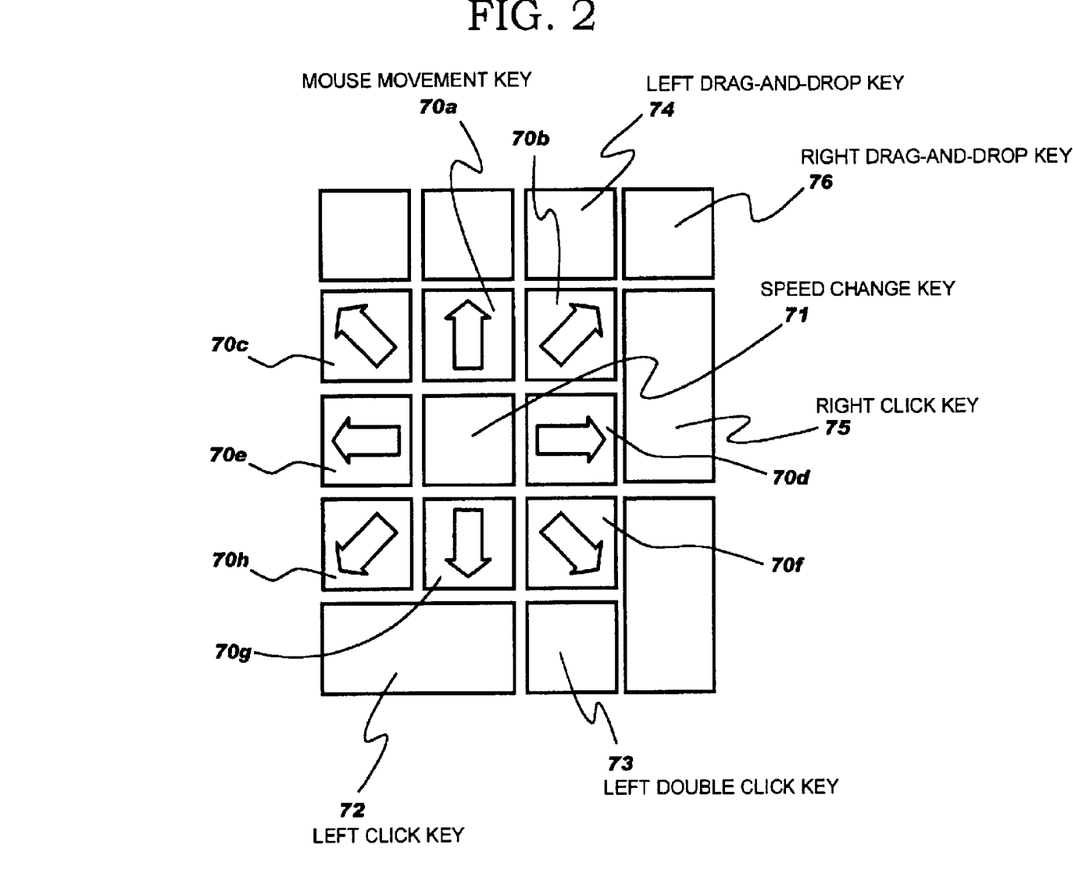
FIG. 2 illustrates a key arrangement in which a ten key keyboard is assigned functions such as a mouse movement.

FIG. 2 illustrates a key arrangement in which a ten key keyboard is assigned functions such as the mouse movement. As shown, mouse movement keys 70a–70h that indicate directions of the mouse movement can be defined for the numeric keys 1–9 (except 5). For the numeric key 5, a speed change key 71 for changing the speed of the mouse movement can be defined. Further, a left click key 72, a left double click key 73, a left drag-and-drop key 74, a right click key 75, and a right drag-and-drop key 76 can be defined that specify click operations such as click, double click, and drag-and-drop as mouse events.

The mouse event clearing section 5 clears a mouse click event following the mouse movement event. In a prior art, a touch of the touch panel (a mouse event) causes the mouse position to be moved to the touched position on the touch panel (a mouse movement event), then a left click event at the mouse position is issued. However, in the present embodiment, because the left click event is cleared by the mouse event clearing section 5, the click event after the mouse movement event is not issued and processing is suspended.

The tool window processing section 6 causes the tool window 10 to be displayed on the touch panel. The tool window 10 is a window that displays buttons that have functions assigned, such as moving the mouse, changing the speed of the mouse movement, and issuing a mouse event. The tool window 10 is generated to have TOPMOST attribute so that it is displayed on top on the touch panel. The tool window may be generated by the tool window processing section 6, or a program component for generating the tool window may be provided.

Figure 3:
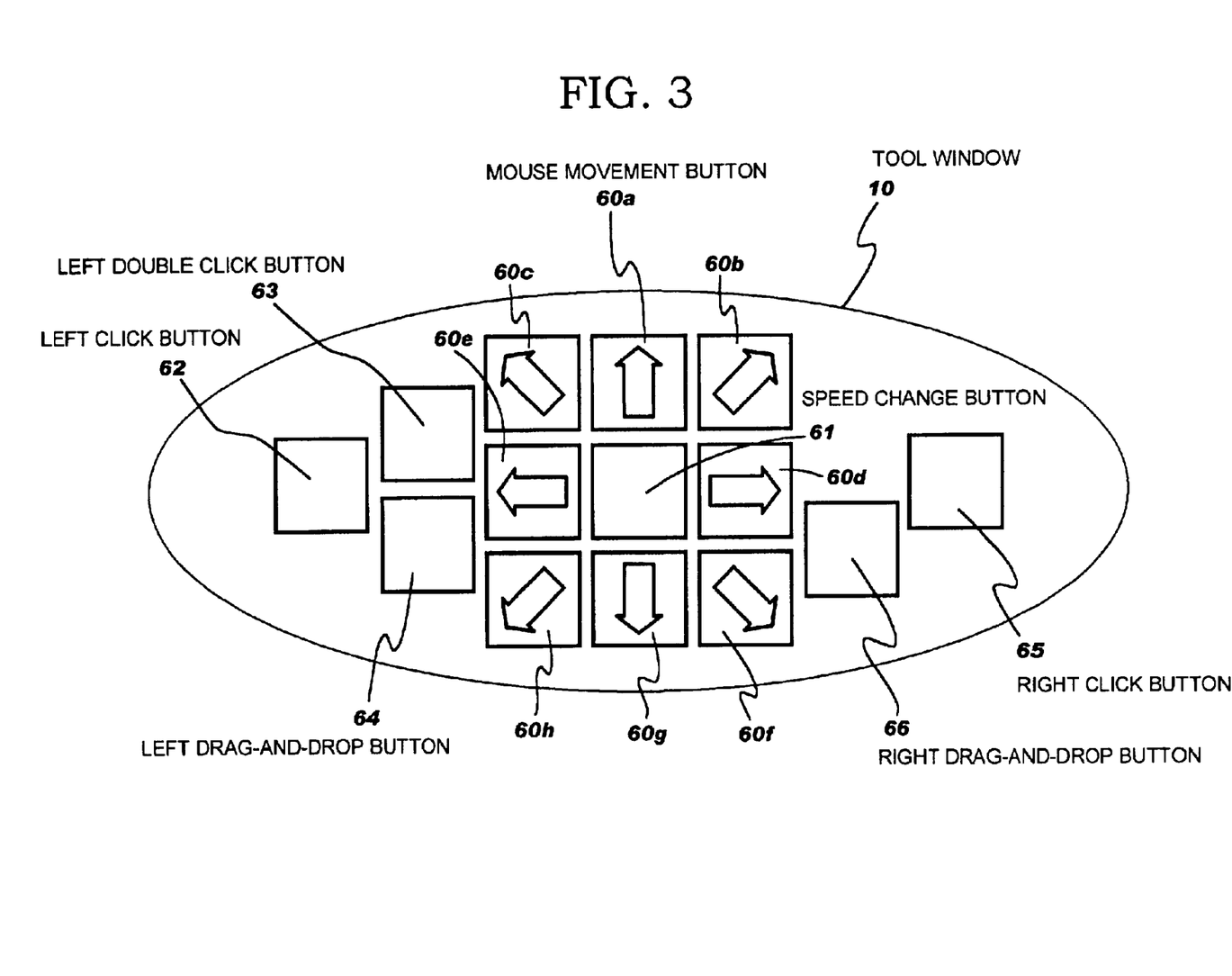
FIG. 3 is a diagram of a screen showing an exemplary tool window 10.

FIG. 3 is a diagram of a screen showing an exemplary tool window 10. The tool window 10 has mouse movement buttons 60a–60h that indicates directions of the mouse movement. It also has a speed change button 61 for changing the speed of the mouse movement. Further, it has a left click button 62, a left double click button 63, a left drag-and-drop button 64, a right click button 65, and a right drag-and-drop button 66, which specify click operations such as click, double click, and drag-and-drop as mouse events. Each button is assigned a function of performing such processing.

The tool window processing section 6 also performs processing when the mouse event occurs within the display area of the tool window 10. Depending on the mouse position of the mouse event, the tool window processing section 6 performs processing in different ways. If the mouse position is within any one of the areas of the mouse movement buttons 60a–60h that assign mouse movement directions or within the area of the speed change button 61 that assigns mouse movement speed, the tool window processing section 6 passes processing to the mouse pointer window processing section 9. If the mouse position is within any one of the areas of the buttons that assign functions of issuing click events (62–66), the tool window processing section 6 passes processing to the mouse event construction and transmission section 7. If the mouse position is in the tool window but in none of the areas of these buttons, the tool window processing section 6 takes the input event (the mouse event) as an intention of moving the tool window 10 and performs processing of moving the tool window 10 to a mouse position where a next mouse event occurs.

The mouse event construction and transmission section 7 receives processing from the mouse event processing section 3 or the keyboard event processing section 4 to construct events that provide click, double click, or drag-and-drop operation and to issue the events to an operating system such as Windows°. For example, to perform a left click operation, an event of pressing the left click button and an event of releasing the left click button are issued at the current mouse position (in the case of the processing from the keyboard event processing section 4) or the previous mouse position (in the case of the processing from the mouse event processing section 3). For Windows°, for example, the events here can be issued through Win 32 API. Other operations will be explained in detail in the description of the method.

The keyboard event forwarding section 8 receives processing from the keyboard event processing section 4 and simply sends the keyboard event to the operating system when a key without definition has been pressed.

The mouse pointer window processing section 9 causes the mouse pointer window 11 to be displayed at the current mouse position. The mouse pointer window 11 is a window that indicates the current mouse position and that is clipped into a shape such as an arrow. The mouse pointer window 11 is generated to have TOPMOST attribute. The mouse pointer window 11 may be generated by the mouse pointer window processing section 9, or a program component for generating the mouse pointer window may be provided. Alternatively, a window clipped into a shape such as an arrow may be generated in advance and stored in a storage area such as a hard disk, so that the mouse pointer window 11 may be generated by calling the stored window. An example of the mouse pointer window 11 is illustrated as an arrow 52 shown in FIG. 6. The mouse pointer window 11 may not necessarily have an arrow shape but may have other shapes such as a cross, a circle (dot), and so on. In addition, the current mouse position, where the mouse pointer window 11 is displayed, may be at the tip of the arrow 52. Any modification is possible to the shape and the display position of the mouse pointer window 11 as long as it is plainly displayed at a mouse position.

The mouse pointer window processing section 9 also receives processing from the mouse event processing section 3 or the keyboard event processing section 4 and updates the mouse position. For example, if the mouse position is within any one of the areas of the mouse movement buttons 60a–60h on occurrence of the mouse event, it receives processing from the mouse event processing section 3 and moves the previous mouse position by a currently specified mouse movement interval in the moving direction defined by the button, and it sets the position as the current mouse position. Thus, in this case, the current mouse position is updated to the position to which the previous mouse position is moved by a predetermined interval in the selected moving direction. Other mouse movement processing will be explained below in detail in the description of the method.

The mouse pointer window processing section 9 also receives processing from the mouse event processing section 3 or the keyboard event processing section 4 and changes the moving speed of the mouse position. If it receives processing of changing the speed of the mouse movement from the mouse event processing section 3, it updates the mouse position to the previous mouse position and updates the currently specified mouse movement interval to a next mouse movement interval. For example, the mouse movement interval has three levels and is cyclically changed each time the mouse movement interval is updated. The mouse movement interval may not necessarily have three levels, but any number of levels more than two may be adopted. Similarly, if the mouse pointer window processing section 9 receives processing of changing the speed of the mouse movement from the keyboard event processing section 4, the mouse movement interval is cyclically changed. However, the current mouse position does not need to be updated in the case of a keyboard event.

The start-up section 12 starts an execution module for providing the above described functions. Once the execution module is started, the keyboard is assigned the functions shown in FIG. 2. That is, starting the execution module allows the mode to be switched to the input mode in which the invention can be implemented. The execution module can be started, for example, by pressing a certain key longer, pressing a combination of certain keys at a time, or restarting or starting the system while holding down a certain key. Alternatively, the start-up section 12 may be automatically started on start-up of the operating system, or may be added to a desktop, a task bar, or a start menu to be started as needed with the keyboard. The start-up section 12 may also be started by an application program. When the execution module has not been started by the start-up section 12, touch panel input is provided as described in the background art, and the keyboard is assigned its original functions (e.g., numerical input).

Figure 4:
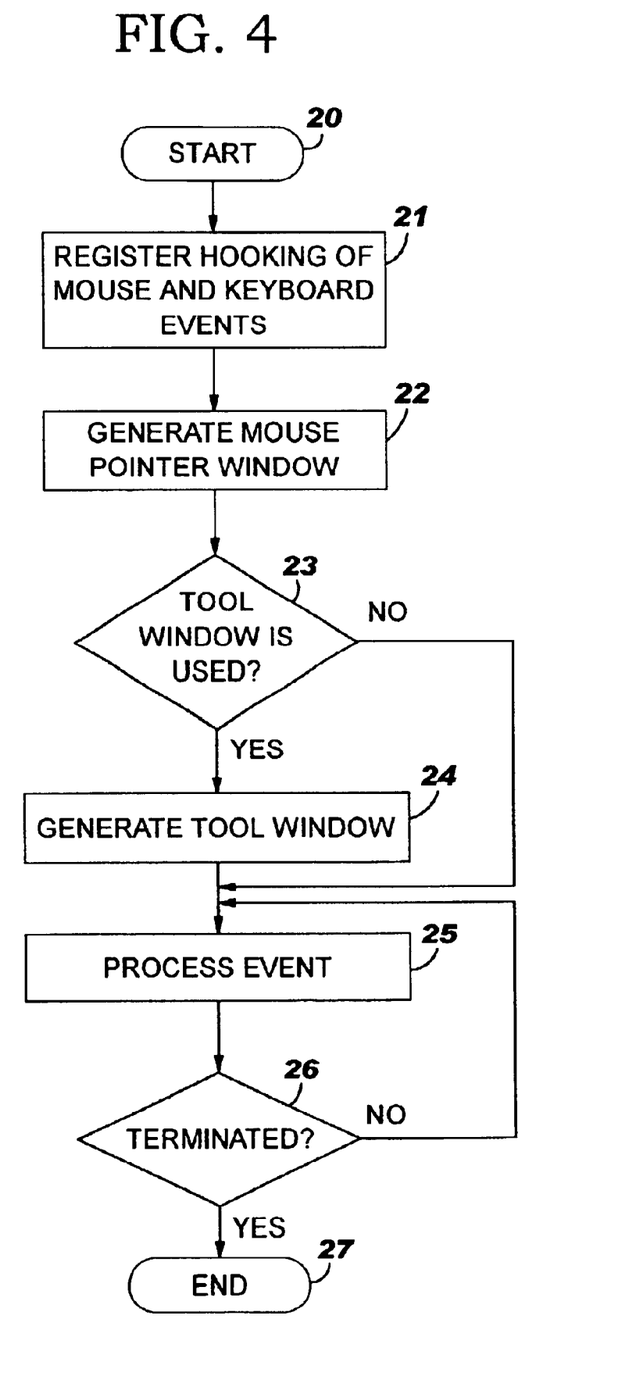
FIG. 4 is a flowchart showing an example of an input method according to an embodiment of the invention.

FIG. 4 is a flowchart showing an example of the input method according to this embodiment. The input method according to this embodiment begins with starting the execution module by the above described start-up section 12 (step 20).

Once the execution module is started, hooking of mouse events and keyboard events is registered (step 21). This allows the event hook section 2 to be informed of all mouse events and keyboard events that are input to the input section 1.

Next, the mouse pointer window 11 is generated (step 22). Further, it is determined whether the tool window 10 is used (step 23), and if it is used, the tool window 10 is generated (step 24). If the tool window 10 is not used, the tool window generation in step 24 is skipped, and the process proceeds to step 25.

In step 25, an input event hooked by the event hook section 2 is processed (step 25). The details of the event processing will be described later. When the event processing is finished, it is determined whether the input method according to this embodiment (running of the execution module) is to be terminated (step 26). If it is to be terminated, the processing with the execution module is finished, and the process returns to the input mode according to the prior art (step 27). If the processing is not to be finished, the process returns to step 25 to repeat execution of the event processing (step 25) for each hooked event.

Figure 5:
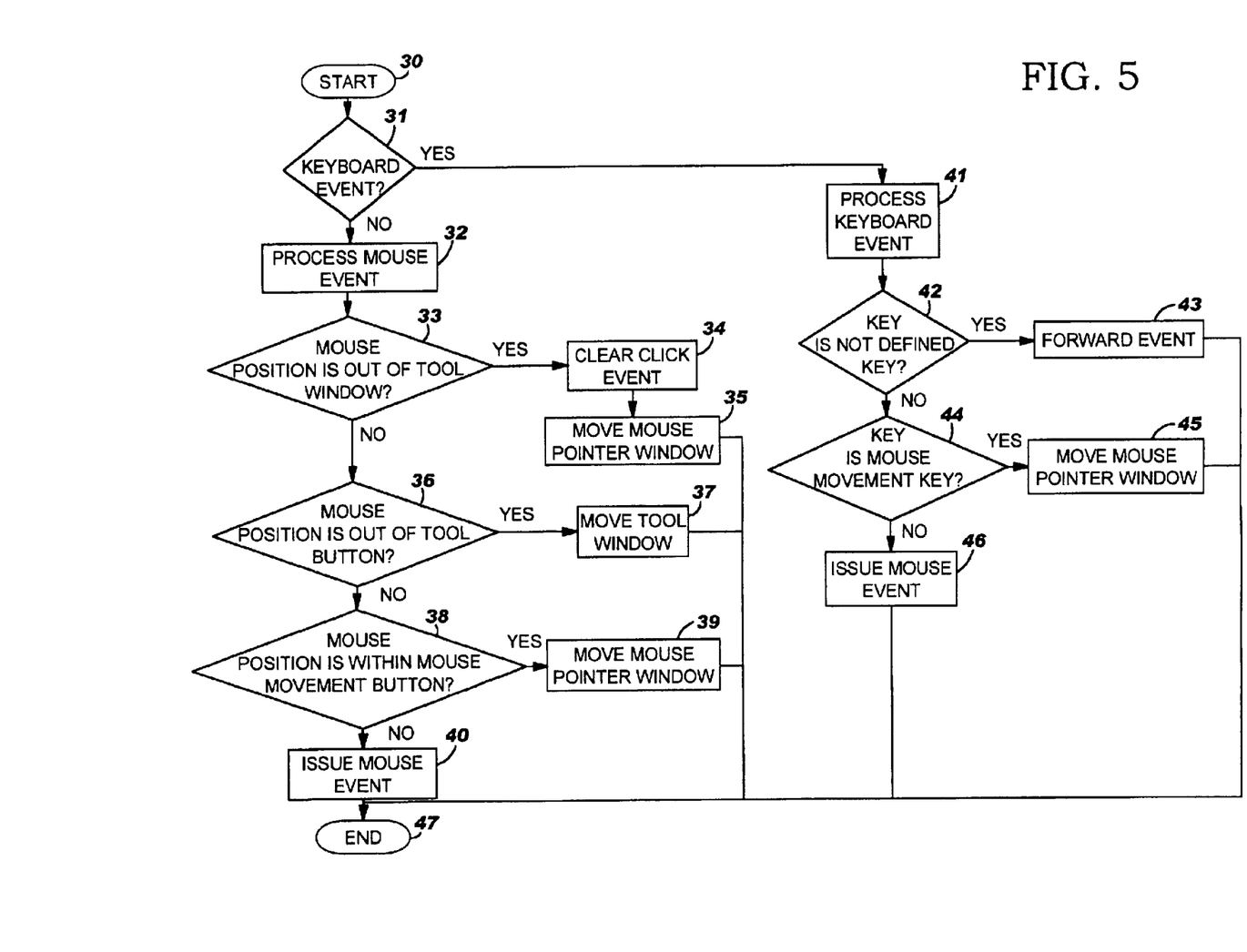
FIG. 5 is a flowchart showing an exemplary procedure of event processing (step 25) in FIG. 4.

FIG. 5 is a flowchart showing an exemplary procedure of the event processing in FIG. 4 (step 25). The processing starts in response to the input event from the input section 1 being hooked by the event hook section 2 (step 30).

First, it is determined whether the input event is a keyboard event (step 31). If it is not a keyboard event (if NO in step 31), the mouse event processing section 3 processes the mouse event (step 32).

Specifically, it is determined whether the mouse position of the input event (the mouse event) is out of the display area of the tool window 10 (step 33). If it is out of the display area (if YES in step 33), the mouse event clearing section 5 disables a click event (step 34). This prevents the input event from causing the click event following the mouse movement, such as a left click event.

Figure 6:
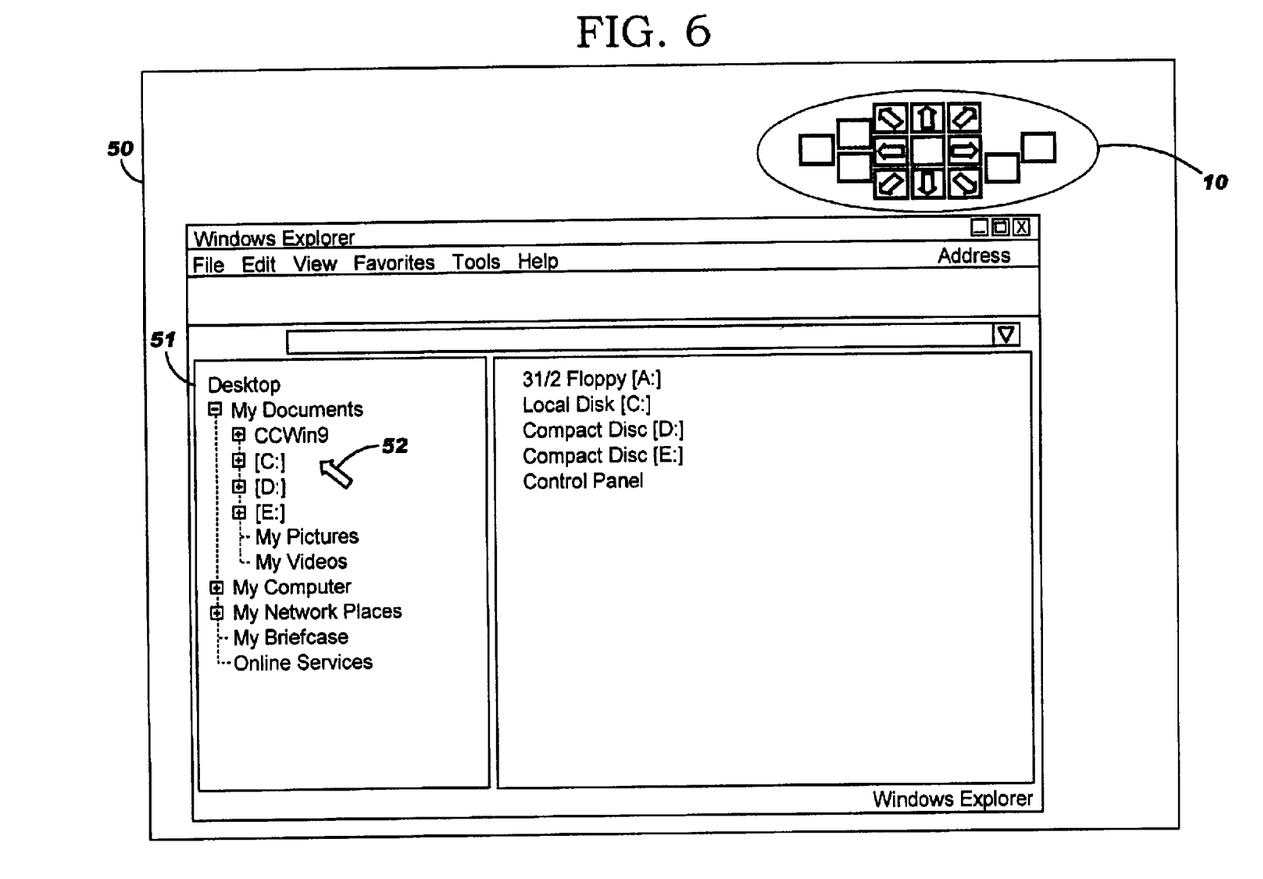
FIG. 6 is a diagram of a screen showing an exemplary display state of a touch panel.

Next, the mouse pointer window processing section 9 moves the mouse pointer window (step 35). Thus, the mouse pointer window 11 (arrow 52) is displayed at the mouse position of this input event (mouse event). Then, the event processing terminates (step 47). FIG. 6 is a diagram of a screen showing an exemplary display state of the touch panel. A window 51 is displayed on a desktop 50 of the touch panel, and the arrow 52, which is a mouse pointer, is displayed. The tool window 10 of FIG. 3 is also displayed. The arrow 52 is displayed on completion of this step and remains on the display until the execution program terminates. FIG. 6 shows the display state immediately after the tip of the arrow 52 is touched as an input event (a click event).

If it is determined that the mouse position is within the area of the tool window 10 in step 33 (if NO in step 33), it is further determined whether the mouse position is out of the areas of the tool buttons (the mouse movement buttons 60a–60h, the speed change button 61, the left click button 62, the left double click button 63, the left drag-and-drop button 64, the right click button 65, and the right drag-and-drop button 66) (step 36). If it is out of the areas of the tool buttons (YES in step 36), the tool window processing section 6 moves the tool window 10 (step 37). That is, it takes the input event (the click event) as an intention of moving the tool window 10 and enters tool window moving mode. It terminates the event processing, waiting for a next event input, and causes the tool window 10 to be displayed at the mouse position of the next event input. In this manner, the tool window 10 can be moved if it interferes with other objects.

If the result of step 36 is NO (if the mouse position is within any one of the areas of the tool buttons), it is further determined whether the mouse position is within any one of the areas of the mouse movement buttons 60a–60h or the speed change button 61 (step 38). If the result is YES (if the mouse position is within any one of the areas of the mouse movement buttons 60a–60h or the speed change button 61), the mouse pointer window processing section 9 performs processing for moving the mouse pointer window 11 (step 39). Then, the event processing terminates (step 47).

Specifically, when the mouse position is within any one of the areas of the mouse movement buttons 60a–60h (i.e., when any one of the mouse movement buttons on the touch panel shown as open arrows in FIG. 6 is touched), the current mouse position is updated to the position that is distant from the previous mouse position (i.e., the position where the mouse pointer window is currently displayed) by a predetermined distance in the direction defined by the mouse movement button. Then, the mouse pointer window 11 is displayed at the current mouse position. As a result, the mouse pointer window 11 has been moved by a predetermined interval in the direction shown on the mouse movement button. The predetermined interval is the mouse movement distance that is currently defined. The mouse movement distance can be changed by touching the speed change button 61. The movement distance currently defined may be displayed on the speed change button 61 as letters such as "High", "Medium", or "Low". Alternatively, the color of the speed change button 61 may be changed correspondingly to the movement distance. When the speed change button 61 is touched (i.e., when the mouse position is within the area of the speed change button 61), the mouse movement speed is changed, and then the current mouse position is updated to the previous mouse position (i.e., the position where the mouse pointer is currently displayed).

If the result of step 38 is NO (if the mouse position is within any one of the areas of the left click button 62, the left double click button 63, the left drag-and-drop button 64, the right click button 65, and the right drag-and-drop button 66), the mouse event construction and transmission section 7 issues a mouse event (step 40). Then, the event processing terminates (step 47).

Specifically, when the mouse position is within the area of the left click button 62, an event of pressing the left click button and an event of releasing the left click button at the previous mouse position (i.e., the position where the mouse pointer window is currently displayed) are constructed and issued. The events are issued with the Win 32 API in the case of Window™ for example.

When the mouse position is within the area of the left double click button 63, an event of pressing the left click button and an event of releasing the left click button at the previous mouse position are issued twice with, for example, the Win 32 API of Windows™.

When the mouse position is within the left drag-and-drop button 64, an event of pressing the left click button at the previous mouse position is issued with, for example, the Win 32 API of Windows™. Then, in the next mouse event, an event of releasing the left click button at the mouse position of the next mouse event is issued with, for example, the Win 32 API of Windows™. In this manner, drag-and-drop with the left click button can be achieved.

When the mouse position is within the area of the right click button 65, an event of pressing the right click button and an event of releasing the right click button at the previous mouse position are issued with, for example, the Win 32 API of Windows™.

When the mouse position is within the right drag-and-drop button 66, an event of pressing the right click button at the previous mouse position is issued with, for example, the Win 32 API of Windows™. Then, in the next mouse event, an event of releasing the right click button at the mouse position of the next mouse event is issued with, for example, the Win 32 API of Windows™. In this manner, drag-and-drop with the right click button can be achieved.

Besides the above procedure, drag-and-drop operation may also be achieved by adopting the following procedure. An event of pressing the left or right click button at the previous mouse position is issued with, for example, the Win 32 API of Windows™. Then, the operation enters a drag mode. After certain operations are repeated and when it is determined that the mouse position is again within the left or right drag-and-drop button 64 or 66, an event of releasing the left or right click button at the previous mouse position is issued with, for example, the Win 32 API of Windows™. With this procedure, an object can be dragged, then moved to any position with the mouse movement buttons 60a–60h in the tool window 10, and dropped at that position by touching again the drag-and-drop button.

Thus, the event processing for a mouse event has been described. Now, the event processing for a keyboard event will be described. If the result in step 31 is YES (if the event is a keyboard event), the keyboard event processing section 4 processes the keyboard event (step 41).

Specifically, it is determined whether the pressed key is not a defined key (step 42). If the result is YES (if a key without definition is pressed), the keyboard event forwarding section 8 forwards the event (step 43). Then, the event processing terminates (step 47). Thus, if the key is not defined for this input method, the event is simply sent to the operating system for originally defined processing.

If the result of step 42 is NO (if a defined key is pressed), it is further determined whether any one of the mouse movement keys 70*a*–70*h* or the speed change key 71 is pressed (step 44). If the result is YES, the mouse pointer window processing section 9 performs processing for moving the mouse pointer window 11 (step 45). Then, the event processing terminates (step 47).

Specifically, when any one of the mouse movement keys 70*a*–70*h* is pressed, the current mouse position is updated to the position that is distant from the current mouse position by a currently defined distance (interval) in the direction defined by the mouse movement key. Then, the mouse pointer window 11 is displayed at the current mouse position. Thus, pressing the mouse movement key causes the mouse pointer window 11 to be moved in the direction of the key. The mouse movement distance and the method for changing the distance are as described above. The mouse movement distance can be changed by pressing the speed change key 71.

If the result of step 44 is NO (if any one of the left click key 72, the left double click key 73, the left drag-and-drop key 74, the right click key 75, and the right drag-and-drop key 76 is pressed), the mouse event construction and transmission section 7 issues the mouse event (step 46). Then, the event processing terminates (step 47).

Specifically, when the left click key 72 is pressed, an event of pressing the left click button and an event of releasing the left click button at the current mouse position are constructed and issued. The events are issued with the Win 32 API in the case of Windows™, for example.

When the left double click key 73 is pressed, an event of pressing the left click button and an event of releasing the left click button at the current mouse position are issued twice with, for example, the Win 32 API of Windows™.

When the left drag-and-drop key 74 is pressed, an event of pressing the left click button at the current mouse position is issued with, for example, the Win 32 API of Windows™. Then, in the next mouse event, an event of releasing the left click button at the mouse position of the next mouse event is issued with, for example, the Win 32 API of Windows™. In this manner, drag-and-drop with the left click button can be achieved.

When the right click key 75 is pressed, an event of pressing the right click button and an event of releasing the right click button at the current mouse position are issued with, for example, the Win 32 API of Windows™.

When the right drag-and-drop key 76 is pressed, an event of pressing the right click button at the current mouse position is issued with, for example, the Win 32 API of Windows™. Then, in the next mouse event, an event of releasing the right click button at the mouse position of the next mouse event is issued with, for example, the Win 32 of Windows™. In this manner, drag-and-drop with the right click button can be achieved.

Besides the above procedure, drag-and-drop operation may also be achieved by adopting the following procedure, as is the case of the mouse events described above. When the left or right drag-and-drop key 74 or 76 is pressed, an event of pressing the left or right click button at the current mouse position is issued with, for example, the Win 32 API of Windows™. Then, the operation enters a drag mode. After certain operations are repeated and when the left or right drag-and-drop key 74 or 76 is again pressed, an event of releasing the left or right click button at the current mouse position is issued with, for example, the Win 32 API of Windows™.

According to the above described input system or method, it is possible to accurately point to a mouse position even in a touch panel input system that does not provided with a pointing device such as a mouse for cost reduction. Therefore, it is possible to increase efficiency in developing or maintaining programs in an on-site environment.

According to the input system or method in this embodiment, since the current mouse position is displayed with the mouse pointer window 11, it is possible to develop or maintain applications in an on-site environment even in a system for which mouse pointer display is disabled in the on-site environment.

According to the input system or method in this embodiment, it is possible to issue not only left click events but also other click events such as double click events and drag-and-drop events.

Further, the input system or method in this embodiment is independent of a device driver for the touch panel, because an input event from the input section 1 is hooked and a click event is disabled as needed. Thus, the input system or method can be applied to input systems that use touch panels of different vendors or types.

The invention made by the inventor has been described above based on an embodiment of it. However, the invention is not to be limited to the described embodiment, but various changes can be made to it without departing from its spirit.

For example, the invention may not necessarily include as essential elements both of the tool window 10 and the keyboard that has various functions defined, described in the above embodiment. The invention may include either one of the tool window 10 and the keyboard shown in FIG. 2.

In addition, the functions assigned to the buttons in the tool window 10 or to the keys on the keyboard of FIG. 2 are only exemplary. Not all of the illustrated functions may be provided, or other functions may be added.

The advantages of the invention disclosed herein, among other things, are as follows. In an input system for a touch panel, a current mouse position can be displayed without adding extra functions to application software used for on-site processing. In an input system that does not have a pointing device capable of precise pointing such as a mouse, it is possible to accurately point to a mouse position. Input means for a touch panel can be provided that can issue left click events as well as other input events. In addition, input means can be provided that can be universally applied to touch panels of a plurality of vendors or types, without depending on a device driver for the touch panel.

What is claimed is:

1. An input method for a touch panel display in an information processing system that detects a touching of the touch panel display or a depression of a key on a keyboard as an input event, said method comprising the steps of:

generating a mouse pointer window in response to an input mode being switched;

receiving and hooking an input event;

if the input event is a mouse event, disabling the mouse event following a mouse movement event; and displaying the mouse pointer window at a position where the touch panel display is touched in the input event.

2. The input method according to claim 1, further comprising the steps of:

generating a tool window to control mouse events and displaying the tool window on the touch panel display;

if the hooked input event is a mouse event, making a first determination whether the mouse position is within the area of the tool window;

disabling the mouse event and displaying the mouse pointer window if the result of the first determination is false;

making a second determination whether the mouse position is within the area of a mouse movement button in the tool window if the result of the first determination is true; and moving the mouse pointer window in a direction assigned by the mouse movement button and displaying the mouse pointer window if the result of the second determination step is true.

3. The input method according to claim 2, further comprising the steps of:

making a third determination whether the mouse position is within the area of a speed change button for changing a moving speed of the mouse pointer window in the tool window if the result of the second determination is false; and changing a setting of moving distance of the mouse pointer window if the result of the third determination is true.

4. The input method according to claim 2, further comprising the steps of:

making a fourth determination whether the mouse position is within the area of a mouse event issuing button in the tool window if the result of the second determination is false; and issuing a mouse event assigned to the mouse event issuing button if the result of the fourth determination is true.

5. The input method according to claim 2, further comprising, if the result of the second determination is false and if the mouse position is not within any one of the areas of buttons in the tool window, the step of moving the tool window to a mouse position where a next mouse event occurs and displaying the tool window.

6. The input method according to claim 1, further comprising the steps of:

if the hooked input event is a keyboard event, making a fifth determination whether a pressed key in the keyboard event is a mouse movement key; and moving the mouse pointer window in a direction assigned to the mouse movement key and displaying the mouse pointer window if the result of the fifth determination is true.

7. The input method according to claim 1, further comprising the steps of:

making a sixth determination whether a pressed key in the keyboard event is a speed change key for changing a moving speed of the mouse pointer window; and changing a setting of moving distance of the mouse pointer window if the result of the sixth determination is true.

8. The input method according to claim 1, further comprising the steps of:

if the hooked input event is a keyboard event, making a seventh determination whether a pressed key in the keyboard event is a mouse event issuing key; and issuing a mouse event assigned to the mouse event issuing key if the result of the seventh determination is true.

9. An input system for a touch panel display in an information processing system that detects a touching of the touch display panel or a press of a key of a keyboard as an input event, comprising:

means for generating a mouse pointer window in response to an input mode being switched;

means for receiving and hooking an input event;

means for, if the input event is a mouse event, disabling the mouse event following a mouse movement event; and means for displaying the mouse pointer window at a position where the touch panel display was touched in the input event.

10. An input system according to claim 9, further comprising:

means for generating a tool window to control mouse events and displaying the tool window on the touch panel;

means for, if the mouse position is within the tool window, determining whether the mouse position is within an area of a mouse movement button, or within an area of a speed change button for changing a moving speed of the mouse pointer window, or within the area of a mouse event issuing button in the tool window, or within none of the areas of the buttons; and means for moving the mouse pointer window in a direction assigned by the mouse movement button and displaying the mouse pointer window if the mouse position is within the area of the mouse movement button, or changing a setting of moving distance of the mouse pointer window if the mouse position is within the area of the speed change button, or issuing a mouse event assigned to the mouse event issuing button if the mouse position is within the area of the mouse event issuing button, or moving the tool window to a mouse position where a next mouse event occurs and displaying the tool window if the mouse position is within none of the areas of the buttons.

11. An input system according to claim 9, further comprising:

means for, if a hooked input event hooked by the means for hooking is a keyboard event, determining whether a pressed key in the keyboard event is a mouse movement key, or a speed change key for changing a mouse movement speed, or a mouse event issuing key; and means for moving the mouse pointer window in a direction assigned to the mouse movement key if the pressed key is the mouse movement key, or changing a moving distance of the mouse pointer window if the pressed key is the speed change key, or issuing a mouse event assigned to the mouse event issuing key if the pressed key is the mouse event issuing key.

12. In a computer system that generates an input event in response to a touch of a touch panel display or a press of a key of a keyboard, a program product that causes a computer to execute the procedures of:

a) generating a mouse pointer window in response to an input mode being switched;

b) receiving and hooking an input event;

c) if the input event is a mouse event, disabling the mouse event following a mouse movement event; and d) displaying the mouse pointer window at a position where the touch panel display was touched in the input event.

13. The program product according to claim 12, further causing the computer to execute the procedures of:

e) generating a tool window to control mouse events and displaying the tool window on the touch panel;

f) if the hooked input event is a mouse event, making a first determination whether the mouse position is within the tool window;

g) disabling the mouse event and displaying the mouse pointer window if said first determining procedure determines that the mouse position is not within the tool window;

h) making a second determination whether the mouse position is within an area of a mouse movement button in the tool window if the said result of the first determination procedure is true;

i) moving the mouse pointer window in a direction assigned by the mouse movement button and displaying the mouse pointer window if the result of the second determination procedure is true;

j) making a third determination whether the mouse position is within the area of a mouse event issuing button in the tool window if the result of the second determination procedure is false; and k) issuing a mouse event assigned to the mouse event issuing button if the result of the third determination procedure is true.

14. The program product according to claim 12, further causing the computer to execute the procedures of:

if the hooked input event is a keyboard event, making a fourth determination whether a pressed key in the keyboard event is a mouse movement key;

moving the mouse pointer window in a direction assigned to the mouse movement key and displaying the mouse pointer window if the result of the fourth determination procedure is true;

making a fifth determination whether the pressed key in the keyboard event is a mouse event issuing key if the result of the fourth determination procedure is false; and issuing a mouse event assigned to the mouse event issuing key if the result of the fifth determination procedure is true.

* * * * *